US012354507B2

(12) United States Patent
Yang

(10) Patent No.: US 12,354,507 B2

(45) Date of Patent: Jul. 8, 2025

(54) BACKPLANE, DISPLAY, AND DISPLAY MODULE

(71) Applicant: SHENZHEN CHINA STAR OPTOELECTRONICS SEMICONDUCTOR DISPLAY TECHNOLOGY CO., LTD., Guangdong (CN)

(72) Inventor: Xiaobo Yang, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,197

(22) PCT Filed: Dec. 20, 2021

(86) PCT No.: PCT/CN2021/139807

§ 371 (c)(1),
(2) Date: Dec. 27, 2021

(87) PCT Pub. No.: WO2023/108693

PCT Pub. Date: Jun. 22, 2023

(65) Prior Publication Data

US 2024/0046825 A1 Feb. 8, 2024

(30) Foreign Application Priority Data

Dec. 16, 2021 (CN) ......................... 202111540848.X

(51) Int. Cl.
*G09F 9/302* (2006.01)
*G09F 9/35* (2006.01)

(52) U.S. Cl.
CPC .............. *G09F 9/3026* (2013.01); *G09F 9/35* (2013.01)

(58) Field of Classification Search
None
See application file for complete search history.

(56) References Cited

U.S. PATENT DOCUMENTS 7,864,514 B2 * 1/2011 Lee ......................... F16M 13/02 362/225
2011/0019348 A1 * 1/2011 Kludt .................... G09F 9/3026 361/679.01

(Continued)

FOREIGN PATENT DOCUMENTS

CN 2389405 Y 7/2000
CN 2595922 Y 12/2003

(Continued)

OTHER PUBLICATIONS

International Search Report in International application No. PCT/CN2021/139807, mailed on Jun. 8, 2022.

(Continued)

*Primary Examiner* — Christopher R Lamb
(74) *Attorney, Agent, or Firm* — PV IP PC; Wei Te Chung

(57) ABSTRACT

A backplane, a display, and a display module are provided. The backplane includes a guide slot and a connecting element. The connecting element is disposed on the guide slot, and the connecting element matches the guide slot in shape. The connecting element is configured to connect the backplane with another backplane. The display and the display module include the above-mentioned backplane.

3 Claims, 4 Drawing Sheets

(56) References Cited

U.S. PATENT DOCUMENTS

| | | | | |
|---|---|---|---|---|
| 2013/0265765 | A1 | 10/2013 | Liang et al. | |
| 2016/0165745 | A1* | 6/2016 | Choi | F16M 11/043 361/679.01 |
| 2016/0267836 | A1 | 9/2016 | Meersman et al. | |
| 2019/0307016 | A1* | 10/2019 | Kwon | H05K 7/18 |
| 2020/0111771 | A1 | 4/2020 | Su et al. | |
| 2023/0019566 | A1* | 1/2023 | Wang | H01F 7/0252 |

FOREIGN PATENT DOCUMENTS

| | | | |
|---|---|---|---|
| CN | 202736410 | U | 2/2013 |
| CN | 103594032 | A | 2/2014 |
| CN | 106558291 | A | 4/2017 |
| CN | 108986679 | A | 12/2018 |
| CN | 109564743 | A | 4/2019 |
| CN | 209133120 | U | 7/2019 |
| CN | 111369900 | A | 7/2020 |
| CN | 211628613 | U | 10/2020 |
| CN | 212276732 | U | 1/2021 |
| CN | 113516922 | A | 10/2021 |
| JP | H06069953 | A | 3/1994 |
| JP | 2017062454 | A | 3/2017 |
| JP | 2017506368 | A | 3/2017 |
| JP | 2021503099 | A | 2/2021 |

OTHER PUBLICATIONS

Written Opinion of the International Search Authority in International application No. PCT/CN2021/139807,mailed on Jun. 8, 2022.

Chinese Office Action issued in corresponding Chinese Patent Application No. 202111540848.X dated Jul. 5, 2022, pp. 1-9.

Japanese Office Action issued in corresponding Japanese Patent Application No. 特願2021-576632 dated Feb. 6, 2024, pp. 1-5.

* cited by examiner

BACKPLANE, DISPLAY, AND DISPLAY MODULE

FIELD OF DISCLOSURE

The present disclosure relates to the field of display technologies, in particular to a backplane, a display, and a display module.

BACKGROUND

With the evolution of optoelectronics and semiconductor technologies, the development of flat panel displays has been driven. Large screen displays can be realized by splicing multiple displays together. An existing display splicing method is to combine multiple independent displays into a large screen through alignment, overlap, and other methods. However, since the displays are all packaged independently, gaps (i.e., physical spliced gaps) and height differences are likely to occur between two adjacent displays after being spliced into a large screen.

SUMMARY OF DISCLOSURE

When a splicing screen displays an image, pictures and texts will be misaligned due to physical spliced gaps and height differences, which greatly affects an image display performance and viewing experience. In view of this, it is necessary to propose a backplane, a display, and a display module to solve the problems existing in the prior art.

In order to solve the above-mentioned problems in the prior art, an object of the present disclosure is to provide a backplane, a display, and a display module with good flatness and extremely narrow spliced gap.

To achieve the above object, the present disclosure provides a backplane, including: a guide slot; and a connecting element disposed on the guide slot, wherein the connecting element matches the guide slot in shape, and the connecting element is configured to connect the backplane with another backplane.

In some embodiment, the guide slot is formed on a side of the backplane.

In some embodiment, the guide slot includes a geometric surface, the connecting element includes a connecting surface connected to the backplane, and the geometric surface is complementary to the connecting surface in shape.

In some embodiment, the geometric surface is a ¼ circular-arc concave surface, the connecting surface is a ¼ circular-arc convex surface, and a radius of curvature of the ¼ circular-arc concave surface is the same as a radius of curvature of the ¼ circular-arc convex surface.

In some embodiment, a part of the backplane corresponding to the first guide slot is made of a metal material, the connecting element is made of a magnetic material, and the connecting element is detachably assembled to the guide slot.

In some embodiment, the display further includes an enhancement element connected to the backplane and the connecting element, and configured to enhance a bonding force between the connecting element and the backplane.

The present disclosure provides a display, including: a backplane including an upper surface and a lower surface opposite to the upper surface, wherein the backplane includes a guide slot recessed relative to the upper surface; a display panel disposed on the lower surface of the backplane; and a connecting element disposed on the guide slot of the backplane, wherein the connecting element matches the guide slot in shape, and the connecting element is configured to connect the display with another display.

In some embodiment, the guide slot is formed on a side of the backplane.

In some embodiment, the guide slot includes a geometric surface, the connecting element includes a connecting surface connected to the backplane, and the geometric surface is complementary to the connecting surface in shape.

In some embodiment, the geometric surface is a ¼ circular-arc concave surface, the connecting surface is a ¼ circular-arc convex surface, and a radius of curvature of the ¼ circular-arc concave surface is the same as a radius of curvature of the ¼ circular-arc convex surface.

In some embodiment, a part of the backplane corresponding to the first guide slot is made of a metal material, the connecting element is made of a magnetic material, and the connecting element is detachably assembled to the guide slot.

In some embodiment, the display further includes an enhancement element connected to the backplane and the connecting element, and configured to enhance a binding force between the connecting element and the backplane.

The present disclosure provides a display module, including: a first display including a first guide slot; a second display including a second guide slot; and a connecting element configured to connect the first display and the second display, wherein the connecting element is disposed on the first guide slot of the first display and the second guide slot of the second display, and the connecting element matches of the first guide slot and the second guide slot in shape.

In some embodiment, the first guide slot is formed on a first side and a second side adjacent to the first side of the first display and extends from the first side to the second side, the second guide slot is formed on a third side and a fourth side adjacent to the third side of the second display and extends from the third side to the fourth side, the first side and the third side are adjacent and connected, and the second side and the fourth side are on a same horizontal line.

In some embodiment, the first guide slot includes a first geometric surface, the second guide slot includes a second geometric surface, the connecting element includes a connecting surface connected to the first display and the second display, the first geometric surface and the second geometric surface are connected to form a combined surface, and the combined surface is complementary to the connecting surface in shape.

In some embodiment, the first geometric surface and the second geometric surface are ¼ circular-arc concave surfaces with a same size, the connecting surface is a semi-circular-arc convex surface, and a radius of curvature of the ¼ circular-arc concave surface is the same as a radius of curvature of the semi-circular-arc convex surface.

In some embodiment, a part of the first display corresponding to the first guide slot and a part of the second display corresponding to the second guide slot are made of metal materials, the connecting element is made of a magnetic material, and the connecting element is detachably assembled to the first guide slot and the second guide slot.

In some embodiment, the first display includes a first backplane and a first display panel, the first guide slot is formed on the first backplane, the first guide slot is recessed relative to an upper surface of the first backplane, and the first display panel is disposed on a lower surface of the first backplane away from the first guide slot; and the second display includes a second backplane and a second display panel, the second guide slot is formed on the second backplane, the second guide slot is recessed relative to an upper surface of the second backplane, and the second display panel is disposed on a lower surface of the second backplane away from the second guide slot.

In some embodiment, the display module further includes a third display and a fourth display, wherein the third display includes a third guide slot, and the fourth display includes a fourth guide slot; the first guide slot, the second guide slot, the third guide slot, and the fourth guide slot are adjacent and connected to form a combined guide slot; and the connecting element is assembled to the combined guide slot to connect the first display, the second display, the third display, and the fourth display together, and the connecting element matches the combined guide slot in shape.

In some embodiment, the display module further includes an enhancement element connected to the first display, the second display, and the connecting element, and configured to enhance a binding force between the connecting element and the first display and the second display.

In comparison with the prior art, the present disclosure adopts that a structure of the guide slot matches with a structure of the connecting element. After the displays are spliced, the gap and height difference between the displays can be controlled to be minimized or even eliminated, so that the two have a physical spliced gap approaching zero and high flatness.

BRIEF DESCRIPTION OF DRAWINGS

The following describes specific implementations of the present disclosure in detail with reference to accompanying drawings to make technical solutions and other beneficial effects of the present disclosure obvious.

DETAILED DESCRIPTION

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the scope of protection of the present disclosure.

Figure 1:
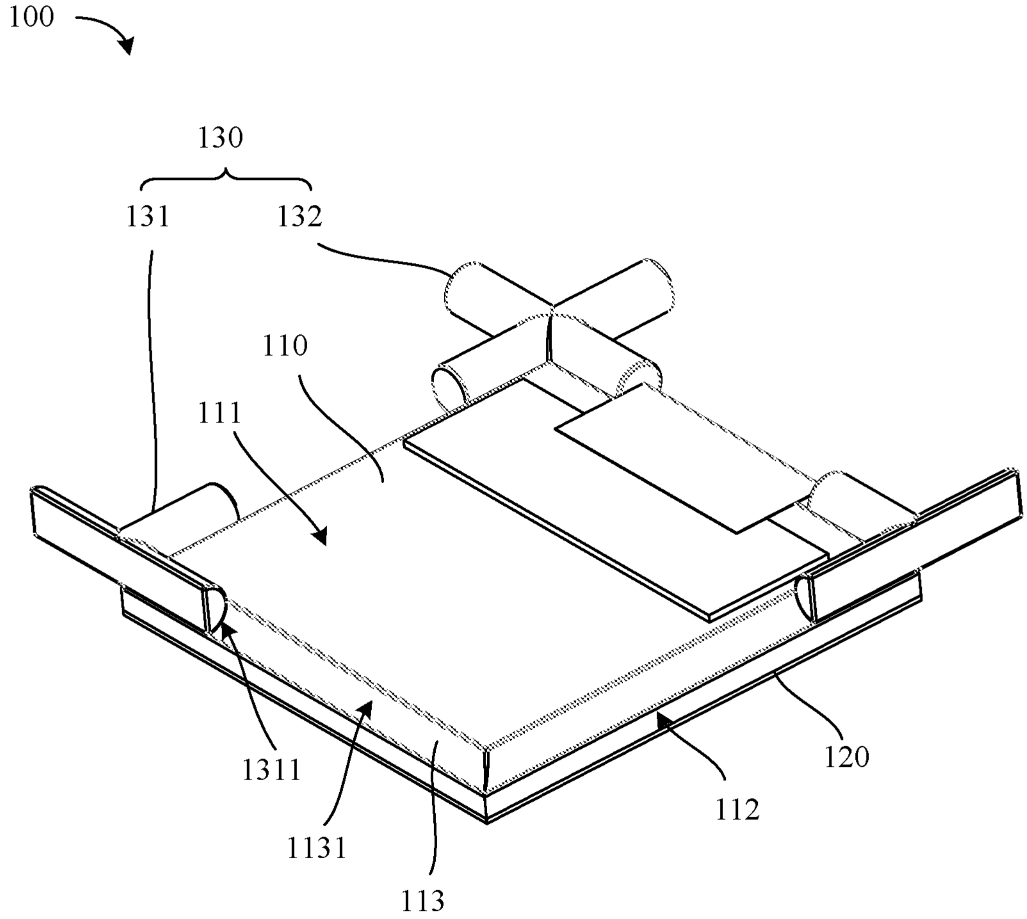
FIG. 1 shows a schematic diagram of a display according to an embodiment of the present disclosure.

Referring to FIG. 1, which shows a schematic diagram of a display 100 according to an embodiment of the present disclosure. The display includes a backplane 110, a display panel 120, and a connecting element 130. The backplane 110 includes an upper surface 111 and a lower surface 112 opposite to the upper surface 111. The display panel 120 is disposed on the lower surface 112 of the backplane 110. The display panel 120 and the backplane 110 are stacked, and outer peripheries of the two are aligned. The backplane 110 includes a guide slot 113. In this embodiment, when viewed from a top view, the guide slot 113 is recessed relative to the upper surface 111 of the backplane 110. At the same time, when viewed from a side view, the guide slot 113 is recessed relative to a side surface of the backplane 110. In some embodiments, the guide slot may be designed to be recessed only relative to the upper surface of the backplane, or only recessed relative to the side surface of the backplane.

In this embodiment, the display panel 120 may be a liquid crystal display panel (LCD) or an organic light-emitting diode (OLED) display panel. A backlight source of a backlight module of the liquid crystal display panel includes mini-LEDs and/or micro-LEDs.

As shown in FIG. 1, the guide slot 113 is formed on a side of the backplane 110. In this embodiment, the display 100 is rectangular. When viewed from a top view, the backplane 110 includes four sides. Preferably, the guide slot 113 is circumferentially formed on the four sides of the backplane 110, so that the display 100 can be spliced with another display through any side. The specific splicing method is described in detail below. It should be noted that, in some embodiments, the display may be a triangle, a polygon, etc., and the guide slot is formed on at least one side of the backplane, but it is not limited thereto.

As shown in FIG. 1, the connecting element 130 is disposed on the guide slot 113 of the backplane 110. In this embodiment, the connecting element 130 includes a first connecting element 131 and a second connecting element 132. The first connecting element131 is T-shaped and is configured to connect display 100 with another display. In addition, the second connecting element 132 is cross-shaped and is configured to connect the display 100 with the other three displays. That is, the second connecting element 132 can be connected to up to four displays.

As shown in FIG. 1, the connecting element 130 matches the guide slot 113 in shape. Taking the first connecting element 131 as an example, the first connecting element131 can be divided into two symmetrical L-shaped parts. One of the L-shaped parts is correspondingly arranged on the guide slot 113 on two adjacent sides of the backplane 110, and the other L-shaped part extends beyond an outer periphery of the backplane 110 to connect with another display. The guide slot 113 includes a geometric surface 1131, and the first connecting element 131 includes a connecting surface 1311 connected to the display 100. Shapes of the geometric surface 1131 and the connecting surface 1311 are complementary. In this embodiment, the geometric surface 1131 is a ¼ circular-arc concave surface, and the connecting surface 1311 is a ¼ circular-arc convex surface. When the first connecting element 131 is assembled to the backplane 110, the connecting surface 1311 of the first connecting element 131 and the geometric surface 1131 of the guide slot 113 are in contact and connected together. It should be noted that a radius of curvature of the ¼ circular-arc concave surface and a radius of curvature of the ¼ circular-arc convex surface are the same.

In this embodiment, by designing the connecting element 130 and the guide slot 113 to have matching arc surfaces, when the display 100 is spliced with another display, the backplanes of the two displays can be physically and completely contacted together. Furthermore, in manufacturing, the splicing method of circular-arc surfaces can well control a process accuracy and achieve a spliced gap approaching zero. In comparison with the prior art, a traditional splicing method is to provide an engaging structure on the two displays, and the two displays are engaged and matched with each other through the engaging structure. In terms of manufacturing, a manufacturing tolerance of the engaging structure is relatively large, so that after the two engaging structures are assembled, a large structural error will occur, that is, a large spliced gap will be generated. Moreover, the traditional splicing method must adjust the flatness artificially, resulting in an obvious height difference between the two spliced displays.

In some embodiments, the guide slot 113 and the connecting element 130 may include other matching shapes, such as rectangular, trapezoidal, V-shaped, triangular, and other geometric shapes. Through the structural matching design of the guide slot 113 and the connecting element 130, after the display 100 is spliced with another display, the gap and height difference between the two can be controlled to be minimized or even eliminated, so that the two have a physical spliced gap approaching zero and high flatness.

In this embodiment, a part of the backplane 110 of the display 100 corresponding to the guide slot 113 is made of a metal material, and the connecting element 130 is made of a magnetic material, so that the connecting element 130 is detachably assembled to the guide slot 113 of the backplane 110 by magnetic attraction. Therefore, the structure of the display 100 of the present disclosure is simple. In addition, the connecting element 130 can be easily assembled or disassembled, so the display 100 has an advantage of being able to be spliced and separated from another display quickly and conveniently.

In some embodiments, an entire backplane 110 may be formed of the metal material, such as a combination of iron and iron oxide. With this design, an overall stability of the backplane 110 can be effectively improved, the deformation of the backplane 110 can be prevented, and the magnetic attraction between the backplane 110 and the connecting element 130 can be maximized. Alternatively, in some embodiments, only the part of the backplane 110 corresponding to the guide slot 113 is made of metal material, and the remaining part is made of plastic material, thereby reducing an overall weight of the display 100 and reducing a production cost.

Figure 2:
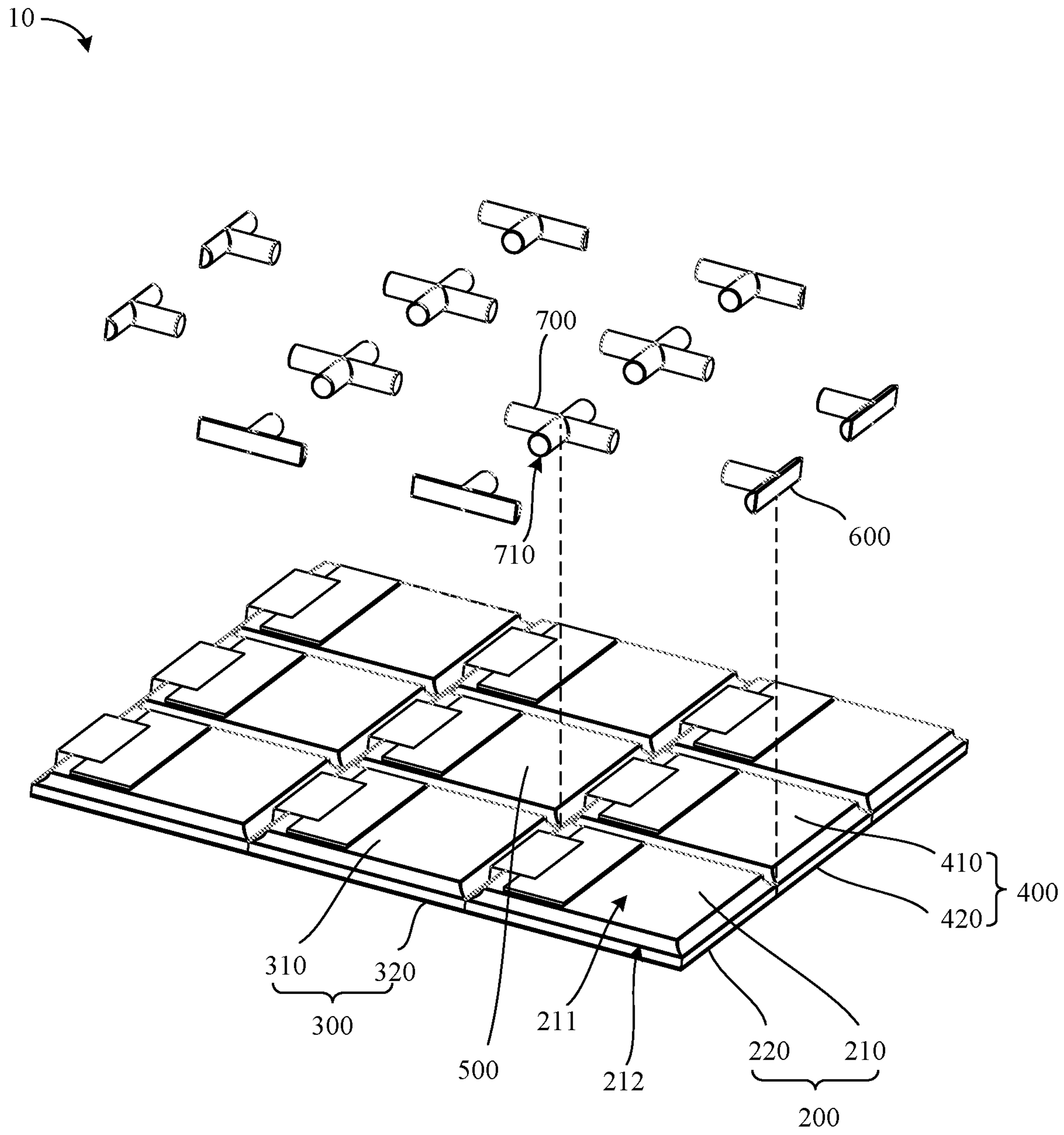
FIG. 2 shows an exploded view of components of a display module according to an embodiment of the present disclosure.
Figure 3:
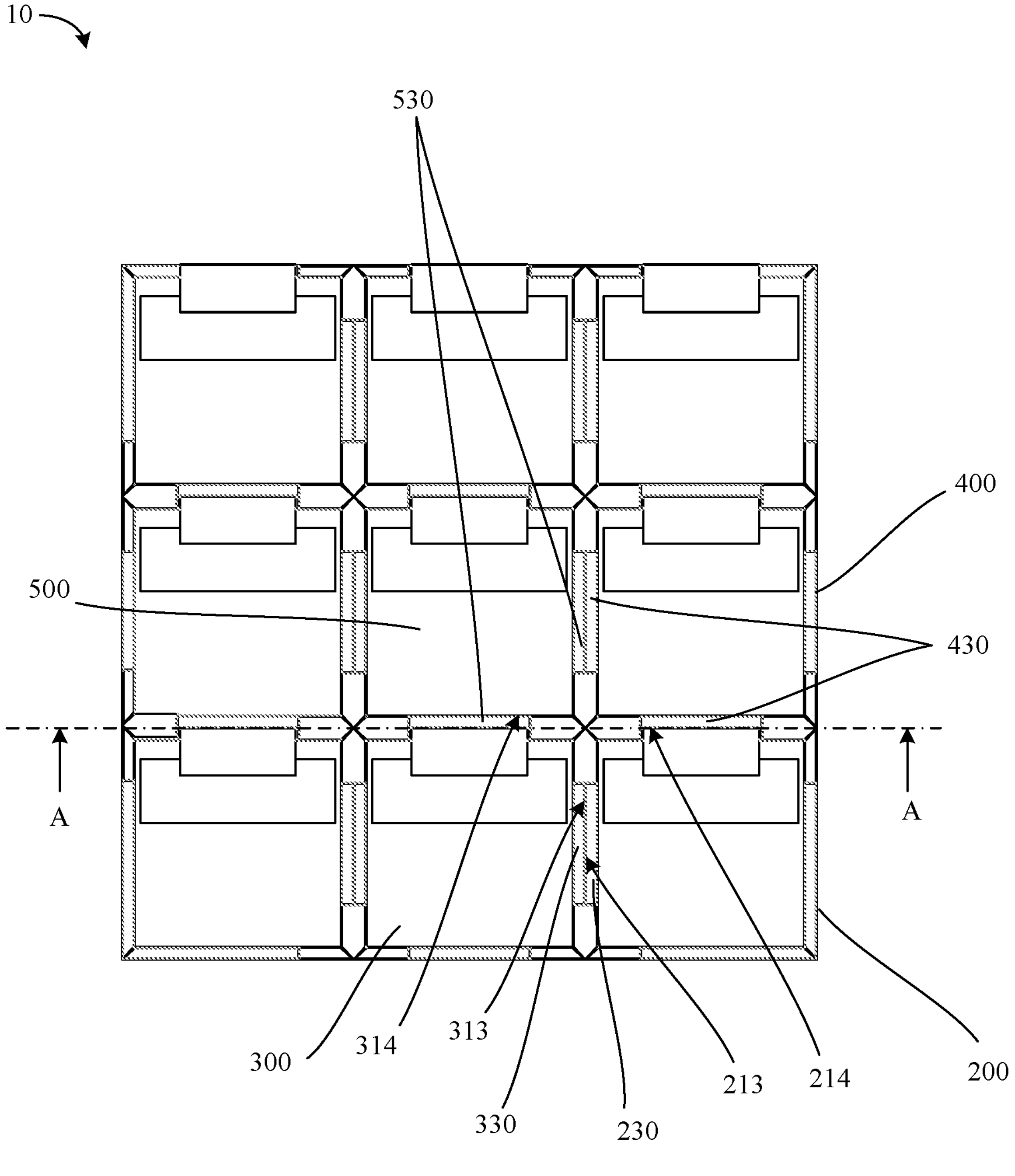
FIG. 3 shows a top view of the display module of FIG. 2.
Figure 4:
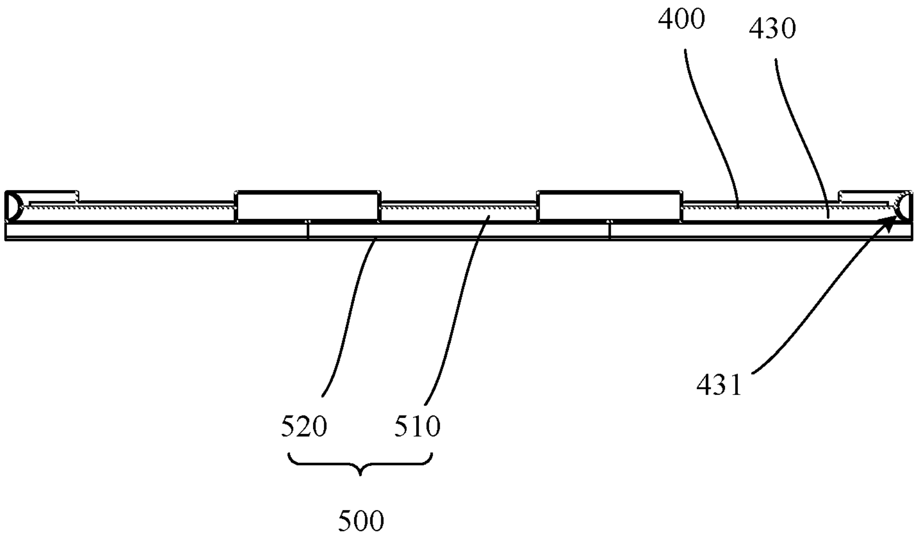
FIG. 4 shows a cross-sectional view of the display module of FIG. 3 along a line A-A.

Referring to FIG. 2 to FIG. 4, FIG. 2 shows an exploded view of components of a display module according to an embodiment of the present disclosure, FIG. 3 shows a top view of the display module of FIG. 2, and FIG. 4 shows a cross-sectional view of the display module of FIG. 3 along a line A-A. The display module 10 includes a plurality of displays and a plurality of connecting elements, such as a first display 200, a second display 300, a third display 400, fourth display 500, a plurality of first connecting element 600, and a plurality of second connecting element 700. The plurality of displays are arranged in an array and are spliced together by the plurality of connecting elements to form a display module 10 with a large-size display screen.

As shown in FIG. 2, the first display 200 includes a first backplane 210 and a first display panel 220, the second display 300 includes a second backplane 310 and a second display panel 320, the third display 400 includes a third backplane 410 and a third display panel 420, and the fourth display 500 includes a fourth backplane 510 and a fourth display panel 520 (as shown in FIG. 4). The first backplane 210 includes an upper surface 211 and a lower surface 212. In the same way, the second backplane 310, the third backplane 410, and the fourth backplane 510 all include the corresponding upper surface and the lower surface. Each display panel may include a liquid crystal display panel (LCD) and an organic light emitting diode (OLED) display panel, and a backlight of a backlight module of the liquid crystal display panel includes mini-LEDs and micro-LEDs.

As shown in FIG. 2 and FIG. 3, the first backplane 210 includes a first guide slot 230 that is recessed relative to the upper surface 211, the second backplane 310 includes a second guide slot 330 that is recessed relative to the upper surface, the third backplane 210 includes a third guide slot 430 that is recessed relative to the upper surface, and the fourth backplane 210 includes a fourth guide slot 530 that is recessed relative to the upper surface.

As shown in FIG. 2 and FIG. 3, the first display panel 220 is disposed on the lower surface 212 of the first backplane 210 away from the first guide slot 230. It should be understood that a contact surface of the first display panel 220 and the first backplane 210 is a non-display surface, and the other surface of the first display panel 220 opposite to the contact surface is a display surface for displaying images. The upper surfaces of all backplanes face a same side, and the lower surfaces of all backplanes also face another same side. The second display panel 320, the third display panel 420, and the fourth display panel 520 are arranged on the lower surfaces of the corresponding backplanes away from the guide slots. It should be understood that in each display, the display panel and the backplane are stacked, and an orthographic projection of the backplane on the display panel is within an outer periphery of the display panel. Preferably, from a top view, a size of the backplane is smaller than or equal to a size of the display panel. When the two are equal in size, the outer peripheries of the two is aligned. Therefore, when the displays are spliced, two adjacent display panels can be tightly joined without being restricted by the structure of the backplane.

As shown in FIG. 2 and FIG. 3, each guide slot is formed on a side of each backplane. For example, the first guide slot 230 is formed at least on a first side 213 and a second side 214 adjacent to that first side 213 of the first backplane 210 of the first display 200, and the first guide slot 230 extends from the first side 213 to the second side 214. The second guide slot 330 is formed at least on a third side 313 and a fourth side 314 adjacent to the third side 313 of the second backplane 310 of the second display 300, and the second guide slot 330 extends from the third side 313 to the fourth side 314. When the first display and the second display are spliced, the first side 213 of the first display 200 and the third side 313 of the second display 300 are adjacent and connected, and the second side 214 of the first display 200 and the fourth side 314 of the second display 300 are on a same horizontal line. In this embodiment, each display is rectangular and includes four sides. Preferably, each guide slot extends around and is formed on the four sides of each backplane, so that each display can be spliced with another display through any side, thereby increasing an assembly flexibility of the display module 10.

As shown in FIG. 2 and FIG. 3, the connecting element is assembled to the display and disposed on the guide slot of the backplane. In this embodiment, the connecting element includes two different shapes of a first connecting element 600 and a second connecting element 700. The first connecting element 600 is T-shaped and is configured to connect two adjacent displays arranged on an outermost side of the display module 10. For example, the first connecting element 600 can be used to connect the first display 200 and the second display 300. In addition, the second connecting element 700 is cross-shaped and is configured to connect four displays arranged in a 2×2 array, and the second connecting element 700 is disposed on a middle of the four displays.

As shown in FIG. 2 and FIG. 3, the first connecting element 600 and the second connecting element 700 match the guide slots of the corresponding assembled displays in shape. The connection method of the T-shaped connecting element is as described above, and will not be repeated here. The following uses the second connecting element 700 as an example to illustrate the splicing of multiple displays. The second connecting element 700 can be divided into four L-shaped parts with a same size. The first L-shaped part is correspondingly disposed on the first guide slot 230 formed on the two adjacent sides of the first backplane 210. The second L-shaped part is correspondingly disposed on the second guide slot 330 formed on the two adjacent sides of the second backplane 310. The third L-shaped part is correspondingly disposed on the third guide slot 430 formed on the two adjacent sides of the third backplane 410. The fourth L-shaped part is correspondingly disposed on the fourth guide slot 530 formed on the two adjacent sides of the fourth backplane 510. The parts of the second connecting element 700 match the first guide slot 230, the second guide slot 330, the third guide slot 430, and the fourth guide slot 530 in shape.

As shown in FIG. 2 and FIG. 4, the second connecting element 700 includes a connecting surface 710 connected to the first to fourth displays. Each guide slot includes a geometric surface, for example, the first guide slot 230 includes a first geometric surface, the second guide slot 330 includes a second geometric surface, the third guide slot 430 includes a third geometric surface 431, and the fourth guide slot 530 includes a fourth geometric surface. Sizes of the first geometric surface, the second geometric surface, the third geometric surface 431, and the fourth geometric surface are the same. When the first to fourth displays are arranged in a 2×2 array and spliced together, the first guide slot 230, the second guide slot 330, the third guide slot 430, and the fourth guide slot 530 are adjacent and connected to form a combined guide slot. Moreover, the first geometric surface is connected with the second geometric surface and together form a combined surface. The first geometric surface is connected with the third geometric surface and together form a combined surface. The second geometric surface is connected with the fourth geometric surface and together form a combined surface. The third geometric surface is connected to the fourth geometric surface and together form a combined surface. Each combined surface is complementary with the connecting surface 710 in shape. In this embodiment, the geometric surface is a ¼ circular-arc concave surface, and the connecting surface 710 is a semi-circular-arc convex surface. It should be noted that a radius of curvature of the ¼ circular-arc concave surface and a radius of curvature of the semi-circular-arc convex surface are the same. When the second connecting element 700 is assembled to the first to fourth backplane, the second connecting element 700 is combined to the combined guide slots. Since the second connecting element 700 matches the combined guide slots in shape, the connecting surface 710 of the second connecting element 700 is in contact with and connected to the geometric surfaces of the first to fourth guide slot, thereby connecting the first display 200, the second display 300, the third display 400, and the fourth display 500 together.

In this embodiment, by designing the connecting element and the guide slot to have matching arc surfaces, when multiple displays are spliced together, the backplanes of two adjacent displays can be physically and completely contacted together. Furthermore, in manufacturing, the splicing method of circular arc surfaces can well control the process accuracy and achieve a spliced gap approaching zero. In comparison with the prior art, a traditional splicing method is to provide an engaging structure on the two displays, and the two displays are engaged and matched with each other through the engaging structure. In terms of manufacturing, a manufacturing tolerance of the engaging structure is relatively large, so that after the two engaging structures are assembled, a large structural error will occur, that is, a large spliced gap and an obvious height difference will be generated. Moreover, the traditional splicing method must adjust the flatness artificially, which consumes human resources. In contrast, when the connecting element of the present disclosure is assembled with the displays, the displays are tightly connected together, and the display surfaces of the display panels are automatically aligned in a same horizontal plane, which prevents the flatness of each display from being adjusted one by one through a mechanism.

In some embodiments, the guide slot and the connecting element may include other matching shapes, such as rectangular, trapezoidal, V-shaped, triangular, and other geometric shapes.

In this embodiment, a part of the backplane of the display corresponding to the guide slot is made of a metal material, and the connecting element is made of a magnetic material, so that the connecting element can be detachably assembled to the guide slot of the backplane through magnetic attraction. Therefore, the structure of the display module 10 of the present disclosure is simple. In addition, the connecting element can be easily assembled or disassembled, so each display in the display module 10 can be spliced and separated from another display quickly and conveniently.

In some embodiments, an entire backplane may be formed of the metal material, such as a combination of iron and iron oxide. With this design, an overall stability of the backplane can be effectively improved, the deformation of the backplane can be prevented, and the magnetic attraction between the backplane and the connecting element can be maximized. Alternatively, in some embodiments, only the part of the backplane corresponding to the guide slot is made of the metal material (e.g., a part of the first backplane 210 of the first display 200 corresponding to the first guide slot 230 and a part of the second backplane 310 of the second display 300 corresponding to the second guide slot 230), and the remaining part is made of a plastic material, thereby reducing an overall weight of the display and reducing a production cost.

In some embodiments, the display module 10 further includes an enhancement element. The enhancement element is connected to the corresponding display and the connecting element. For example, as shown in FIG. 2, the enhancement element can be connected to the first display 200, the second display 300, and the first connecting element 600, and is configured to enhance a binding force between the first connecting element 600 and the first display 200 and the second display 300. In some embodiments, the enhancement element includes a screw and an adhesive. When the enhancement element is the screw, a corresponding screw hole is formed on the display and the connecting element. When the enhancement element is the adhesive, the adhesive is disposed between the guide slot and the connecting element of the display. Alternatively, in some embodiments, a non-magnetic connecting element may be used, and the enhancement element may be used to realize the connection between the connecting element and the backplane of the display.

In the present disclosure, a structure of the guide slot matches with a structure of the connecting element. After the displays are spliced, the gap and height difference between the displays can be controlled to be minimized or even eliminated, so that the two have a physical spliced gap approaching zero and high flatness.

The backplane, the display, and the display module provided by the embodiments of the present disclosure are described in detail above. In this specification, specific examples are used to describe the principles and implementations of the present disclosure. The description of the above examples is only used to help understand the technical solutions and core ideas of the present disclosure. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present disclosure.

What is claimed is:

1. A backplane, comprising:

one or more guide slots, wherein the backplane comprises an upper surface, a lower surface opposite to the upper surface, and side surfaces perpendicular to the upper surface and the lower surface, the lower surface is for disposing a display panel, and at least one of the one or more guide slots is recessed relative to the upper surface and at least one of the side surfaces; and one or more connecting elements each disposed on at least one of the one or more guide slots, wherein each connecting element matches the at least one guide slot in shape, and the connecting element is configured to connect the backplane with one or more other backplanes, wherein each of the at least one guide slot comprises a geometric surface, the connecting element comprises a connecting surface connected to the backplane, and the geometric surface is complementary to the connecting surface in shape, the geometric surface is a ¼ circular-arc concave surface, the connecting surface is a ¼ circular-arc convex surface, and a radius of curvature of the ¼ circular-arc concave surface is the same as a radius of curvature of the ¼ circular-arc convex surface, wherein the one or more connecting elements comprise a first connecting element and a second connecting element, the first connecting element is T-shaped and is configured to connect the backplane with another one backplane, and the second connecting element is cross-shaped and is configured to connect the backplane with other three backplanes.

2. A display, comprising:

a backplane comprising an upper surface and a lower surface opposite to the upper surface and side surfaces perpendicular to the upper surface and the lower surface, wherein the backplane comprises one or more guide slots, and at least one of the one or more guide slots is recessed relative to the upper surface and at least one of the side surfaces;

a display panel disposed on the lower surface of the backplane; and one or more connecting elements each disposed on at least one of the one or more guide slots, wherein each connecting element matches the at least one guide slot in shape, and the connecting element is configured to connect the display with one or more other backplanes, wherein each of the at least one guide slot comprises a geometric surface, the connecting element comprises a connecting surface connected to the backplane, and the geometric surface is complementary to the connecting surface in shape, the geometric surface is a ¼ circular-arc concave surface, the connecting surface is a ¼ circular-arc convex surface, and a radius of curvature of the ¼ circular-arc concave surface is the same as a radius of curvature of the ¼ circular-arc convex surface, wherein the one or more connecting elements comprise a first connecting element and a second connecting element, the first connecting element is T-shaped and is configured to connect the display with another one display, and the second connecting element is cross-shaped and is configured to connect the display with other three displays.

3. A display module, comprising:

a plurality of displays, wherein the plurality of displays comprise a first display comprising a first guide slot and a second display comprising a second guide slot, wherein the first display comprises a first backplane and a first display panel, the first guide slot is formed on the first backplane, the first guide slot is recessed relative to an upper surface of the first backplane and at least one side surface of the first backplane perpendicular to the upper surface, and the first display panel is disposed on a lower surface of the first backplane away from the first guide slot; and the second display comprises a second backplane and a second display panel, the second guide slot is formed on the second backplane, the second guide slot is recessed relative to an upper surface of the second backplane and at least one side surface of the second backplane perpendicular to the upper surface, and the second display panel is disposed on a lower surface of the second backplane away from the second guide slot; and a plurality of connecting elements configured to connect the plurality of displays, wherein a connecting element of the plurality of connecting elements configured to connect the first display and the second display, the connecting element is disposed on the first guide slot of the first display and the second guide slot of the second display, and the connecting element matches of the first guide slot and the second guide slot in shape, wherein the first guide slot comprises a first geometric surface, the second guide slot comprises a second geometric surface, the connecting element comprises a connecting surface connected to the first display and the second display, the first geometric surface and the second geometric surface are connected to form a combined surface, and the combined surface is complementary to the connecting surface in shape, the first geometric surface and the second geometric surface are ¼ circular-arc concave surfaces with a same size, the connecting surface is a semi-circular-arc convex surface, and a radius of curvature of the ¼ circular-arc concave surface is the same as a radius of curvature of the semi-circular-arc convex surface;

wherein the plurality of connecting elements comprise a first connecting element and a second connecting element, the first connecting element is T-shaped and is configured to connect two adjacent displays of the plurality of displays arranged on an outermost side of the display module, and the second connecting element is cross-shaped and is configured to connect four displays of the plurality of displays that are arranged in a 2×2 array, and the second connecting element is disposed on a middle of the four displays.

* * * * *